United States Patent Office 3,598,794
Patented Aug. 10, 1971

3,598,794
RECOVERY OF FLUOROELASTOMER FROM AQUEOUS DISPERSION
Arthur Nersasian, Wilmington, Del., assignor to E. I. du Pont de Nemours and Company, Wilmington, Del.
No Drawing. Filed Feb. 25, 1969, Ser. No. 802,237
Int. Cl. C08f 1/92
U.S. Cl. 260—80.76      6 Claims

ABSTRACT OF THE DISCLOSURE

A fluoroelastomer is recovered from an aqueous dispersion of the elastomer by admixing the dispersion with a small amount of a polyamine and separating the elastomer from the mixture.

THE INVENTION

This invention concerns the recovery of a fluoroelastomer from aqueous dispersions of the elastomer.

Conventionally fluoroelastomers are made in aqueous dispersions and recovered therefrom by admixing the dispersion with an inorganic coagulating agent, such as hydrochloric acid or potassium alum, and then mechanically separating the solid elastomer from the aqueous portion. One difficulty with such systems has been the need to remove the coagulating agent practically completely from the recovered polymer prior to use since otherwise it retards the curing of the elastomer by amines, which are normally used as curing agents for these elastomers. Also these coagulants some times produce a relatively poor elastomer crumb, that is, a crumb with an undesirably broad particle size distribution and/or in the form of agglomerates. At other times the product is a syrup or solid paste which is difficult to isolate and dry.

Polyamines have been suggested as coagulating aids for synthetic elastomers such as butadiene/styrene polymers but with little success. U.S. 3,350,371 to Santmyers points out, for example, that aliphatic polyamines are used reluctantly by the butadiene/styrene industry because the crumb produced through their use is generally found to be sticky and very difficult to dry and handle. The sticky crumb thus produced presents drying problems and provides increased maintenance of process equipment. Moreover, because the crumb is relatively dense, excessive drying periods are required. According to this patent these long drying periods slow down the rate of rubber production to an undesirable extent, particularly in a continuous process.

The rate at which an elastomer is manufactured is generally dependent upon the rated capacity of the driers used to dry the crumb that is produced. The condition of the crumb whether it is sticky and dense or whether it is relatively dry and fluffy, directly influences the rate of production in that the rated capacity of the driers used is decreased or increased. Not only is the production rate decreased with a sticky crumb but crumb accumulations in the drier necessitate frequent shut downs for cleaning. There has been a need to develop a fluoroelastomer recovery process which eliminates the use of potassium alum and other agents that require a subsequent washing step to provide a usable elastomer. At the same time, of course, it is equally important to have a recovery process which produces a light fluffy crumb capable of being easily and quickly dried by conventional drying equipment.

In accordance with this invention an aqueous dispersion of a fluoroelastomer is admixed with a very small amount of a polyamine, the mixture is agitated to coagulate the elastomer and the elastomer is then separated from the aqueous phase by conventional means. The polyamines are utilized in amounts so small that no washing of the polymer is necessary to remove them and there is no deleterious effect on the polymer properties by leaving such residues in the polymer.

The term "polyamine" refers to water soluble polyamines generally. Certain of their water soluble salts are also useful, although less desirable, such as hydrohalide (e.g., hydrobromide, hydrofluoride, hydrochloride) and sulfate salts. Representative aliphatic polyamines include aralkylene diamines such as xylylene diamine, heterocyclic diamines such as piperazine hexahydrate, alkylene and polyalkylene polyamines such as ethylene diamine, propylene diamine, diethylene triamine, diamylene triamine, triethylene tetramine, tripropylene tetramine, diethylene-propylene tetramine, tetraethylene pentamine, tetrabutylene pentamine, butylene diamine, dihexylene triamine, trihexylene tetramine, and the like, or mixtures thereof.

A suitable commercially available polyamine product of this type is a crude dihexylene triamine containing minor amounts of other polyalkylene polyamines which is marketed by E. I. du Pont de Nemours and Company under the trade name of "Amine 248." Another is a crude diethylene triamine containing minor amounts of ethylene diamine and triethylene tetramine marketed by Union Carbide Corporation under the trade name "Polyamine H."

Other useful polyamines include those resulting from distillation processes for recovery of amines and comprising mixtures of polyamines of the general formula:

$$H_2N[(CH_2)_n-NH]_x-H$$

where $n$ is a positive whole number from 2 through 12; and $x$ is a positive whole number from 1 through 20.

Thus polyamines suitable for practice of the present invention include those which are made of diamine monomers containing from 2 through 12 carbon atoms and which have from 1 through 20 monomers linked together in the polymer. They can be used in mixed forms or as relatively pure compounds. Some of the compounds present when in mixed form are often also cyclic imines. The polyamines present can be substituted with alkyl radicals of from 1 through 4 carbon atoms.

Because of the very small amounts of polyamine used in operating this invention it is convenient to add the polyamine in the form of an aqueous solution to the elastomer dispersion. A solution containing about 0.04–10% polyamine is generally preferred.

The polyamine is generally used in this invention in an amount of about 0.0025%–0.025% based on the weight of elastomer and preferably 0.005%–0.02% on this basis. The use of too much amine in the absence of subsequent removal by washing or other means tends to make the elastomer unstable and should be avoided. By using the small amounts characteristic of this invention the danger of instability is eliminated even in the absence of such removal.

The means for admixing the polyamine with the aqueous dispersion is not critical and conventional practices such as those utilized with coagulants, such as potassium alum, can be employed. Naturally uniform mixing is desirable but this is easily attained with adequate agitation.

Fluoroelastomers which can be recovered from their aqueous dispersion by this invention include polymers and copolymers of fluorine substituted ethylenically unsaturated monomers, for example, copolymers produced by copolymerizing vinylidene fluoride with hexafluoropropene. Fluoroelastomers can contain other substituents such as other halogens (e.g., chlorine) as well as ether and ester groups.

Copolymers of vinylidene fluoride with 1,1-chlorofluoroethylene, tetrafluoroethylene, bromotrifluoroethylene, 2-chlorofluoropropylene and chlorotrifluoroethylene can also be recovered by the process of this invention. These include terpolymers such as vinylidene fluoride/ tetrafluoroethylene/hexafluoropropylene polymer. Copolymers of alkyl vinyl ethers with vinylidene fluoride and/or tetrafluoroethylene can also be covered. Representative alkyl vinyl ethers include methyl vinyl ether, trifluoromethyl vinyl ether, methyl trifluorovinyl ether, etc.

The following examples (except Examples 11 and 13 which are controls) illustrate the invention. All parts, percentages and proportions are by weight unless otherwise indicated.

EXAMPLES 1–10

Polyalkylene polyamine in the form of the pure compound or as a solution (as shown in Table I) is added to an aqueous dispersion of a vinylidene fluoride/hexafluoropropene polymer containing 21.8% polymer and stirred until the polymer separates from the dispersion as shown by formation of a gel which prevents further stirring. At this point a clear aqueous phase (serum) is apparent. The amount of polymer remaining in the serum is a measure of the efficiency of the precipitating agent.

Table I shows the effect of various amines on fluoropolymer aqueous dispersions.

TABLE I

| Example No.: | Amine | Form | Ml.[1] | Time to gel |
|---|---|---|---|---|
| 1 | m-Xylylene diamine | Pure amine | 0.05 | Immediately. |
| 2 | 1,4-bis(aminomethyl)cyclohexane | do | 1.5 | 15' after addition. |
| 3 | Piperazine hexahydrate | 1% aqueous solution | 8 | Immediately. |
| 4 | Tetraethylene pentamine | Pure amine | 0.05 | Do. |
| 5 | do | 1.0% aqueous solution | 1.0 | Do. |
| 6 | do | 0.2% aqueous solution | 2.0 | Do. |
| 7 | Triethylene tetramine | 2.0% aqueous solution | 0.7 | Do. |
| 8 | do | 1.0% aqueous solution | 1.1 | 2 minutes after addition. |
| 9 | do | 0.1% aqueous solution | 5.0 | Immediately. |
| 10 | do | 0.05% aqueous solution | 8.0 | 3 minutes after addition. |

[1] Milliliters per 100 milliliters of dispersion.

EXAMPLE 11

Another portion of the dispersion of Example 1 is fed continuously to a centrifuge (Sharpless, Super-D-Canter, Model No. P–600D) at the rate of 25,000 ml./hr. or 27,700 g./hr. Water is fed concurrently to the centrifuge at the rate of 600 ml./hr. After 10 minutes of run time to allow the system to equilibrate (hold-up time 3'), a serum (clear aqueous phase) sample is collected and its polymer content determined by drying an aliquot portion. The serum contains 1.2% polymer which corresponds to a product loss of 4.3%.

EXAMPLE 12

The continuous procedure of Example 11 is repeated except that an aqueous solution of triethylene tetramine (0.5 g. amine in 600 ml. of water) is substituted for the water feed to obtain an amine feed rate of 0.5 g./hr.

The serum is found to contain 17% less polymer (less loss) than the serum of the control in Example 11.

EXAMPLE 13

The continuous procedure of Example 11 is repeated except that the emulsion feed rate is 15,000 ml./hr. or 16,600 g./hr. and 20 minutes of run time is used to allow the system to equilibrate. The serum contains 0.9% polymer which corresponds to a product loss of 3.1%.

EXAMPLE 14

The continuous procedure of Example 13 is repeated except that an aqueous solution of triethylene tetramine (0.5 g. amine in 600 ml. of water) is substituted for the water feed to obtain an amine feed rate of 0.5 g./hr. The serum contains 22% less polymer (less loss) than the serum of the control in Example 13.

EXAMPLE 15

The continuous procedure of Example 13 was repeated except that an aqueous solution of triethylene tetramine (1.5 g. in 598 ml. water) was substituted for the water feed to obtain an amine feed rate of 1.5 g./hr. The serum contains 44% less polymer than the serum of the control of Example 13.

What is claimed is:

1. In the process for recovering a fluoroelastomer which is a copolymer of vinylidene fluoride with at least one other fluorinated ethylenically unsaturated monomer from an aqueous dispersion of the elastomer, the improvement which consists essentially of mixing the dispersion with 0.0025–0.025% based on the weight of elastomer of a water soluble polyamine selected from alkylene polyamines, polyalkylene polyamines, aralkylene polyamines, alicyclic polyamines, heterocylic polyamines, and mixtures thereof and separating the elastomer from the mixture.

2. The process of claim 1 in which the polyamine is a polyalkylene polyamine.

3. The process of claim 1 in which the polyamine is a triethylene tetramine.

4. The process of claim 1 in which the polyamine is a xylylene diamine.

5. The process of claim 1 in which the polyamine is a piperazine.

6. A process of claim 1 in which the polyamine is a polymer of the formula $$H_2N[(CH_2)_n-NH]_x-H$$

where $n$ is a positive whole number from 2 through 12 and $x$ is a positive whole number from 1 through 20.

References Cited

UNITED STATES PATENTS

| | | | |
|---|---|---|---|
| 2,347,576 | 4/1944 | Ogilby | 260—821 |
| 2,359,698 | 10/1944 | Uhlig | 260—821 |
| 2,607,753 | 8/1952 | Adams | 260—41 |
| 2,995,512 | 8/1961 | Leslie et al. | 210—54 |
| 3,015,641 | 1/1962 | Bawn et al. | 260—29.7 |
| 3,015,642 | 1/1962 | Bawn et al. | 260—29.7 |
| 3,256,251 | 6/1966 | Carey | 260—79.3 |
| 3,350,371 | 10/1967 | Santmyers | 260—85.1 |

JOSEPH L. SCHOFER, Primary Examiner

S. M. LEVIN, Assistant Examiner

U.S. Cl. X.R.

260—80.77, 83.7, 87.7